United States Patent
Chang et al.

(10) Patent No.: US 12,474,219 B2
(45) Date of Patent: Nov. 18, 2025

(54) DUAL-PURPOSE TEMPERATURE MEASURING DEVICE

(71) Applicant: RADIANT INNOVATION INC., Hsinchu County (TW)

(72) Inventors: Yung-Chang Chang, Hsinchu County (TW); Po-Hung Chen, Taichung (TW)

(73) Assignee: RADIANT INNOVATION INC., Hsinchu County (TW)

( * ) Notice: Subject to any disclaimer, the term of this patent is extended or adjusted under 35 U.S.C. 154(b) by 447 days.

(21) Appl. No.: 18/097,362

(22) Filed: Jan. 16, 2023

(65) Prior Publication Data

US 2024/0240992 A1  Jul. 18, 2024

(51) Int. Cl.
*G01K 1/022* (2021.01)
*A61B 5/01* (2006.01)
*G01K 13/20* (2021.01)

(52) U.S. Cl.
CPC ............ *G01K 1/022* (2013.01); *A61B 5/01* (2013.01); *G01K 13/20* (2021.01)

(58) Field of Classification Search
CPC ....... G01K 1/022; G01K 13/20; G01J 5/0025; G01J 5/02; G01J 5/025; G01J 5/04; G01J 5/0011; A61B 5/01
USPC ................................................ 374/100, 186
See application file for complete search history.

(56) References Cited

U.S. PATENT DOCUMENTS

2014/0003461 A1 * 1/2014 Roth ............... G01K 13/20
374/E1.018
2016/0109300 A1 * 4/2016 Lin ................. G01K 1/08
374/100

FOREIGN PATENT DOCUMENTS

JP       2000126136 A  *  5/2000

* cited by examiner

*Primary Examiner* — Peter J Macchiarolo
*Assistant Examiner* — Mireille S Sadate-Moualeu
(74) *Attorney, Agent, or Firm* — Li & Cai Intellectual Property (USA) Office

(57) ABSTRACT

A dual-purpose temperature measuring device includes a device main body, a signal control module, a first temperature measurement module, a movable structure, a second temperature measurement module and an information display module. The signal control module is disposed inside the device main body. The first temperature measurement module is disposed inside the device main body and electrically connected to the signal control module. The movable structure is movably disposed on the device main body. The second temperature measurement module is disposed inside the movable structure and electrically connected to the signal control module. The information display module is disposed on the device main body and electrically connected to the signal control module. Therefore, the user can selectively use one of the first temperature measurement module and the second temperature measurement module to measure the temperature of the same predetermined object or different predetermined objects according to different requirements.

20 Claims, 8 Drawing Sheets

DUAL-PURPOSE TEMPERATURE MEASURING DEVICE

FIELD OF THE DISCLOSURE

The present disclosure relates to a temperature measuring device, and more particularly to a dual-purpose temperature measuring device.

BACKGROUND OF THE DISCLOSURE

In the related art, a temperature measuring device has only a single measurement purpose, so that the functionality of the temperature measuring device is limited in use. In addition, when the temperature measuring device is affected by an ambient temperature, the temperature measuring device temporarily cannot be provided to a user for temperature measurement. As such, the user must wait for an indeterminate period of time before continuing to use the temperature measuring device for temperature measurement.

SUMMARY OF THE DISCLOSURE

In response to the above-referenced technical inadequacy, the present disclosure provides a dual-purpose temperature measuring device.

In one aspect, the present disclosure provides a dual-purpose temperature measuring device, which includes a device main body, a signal control module, a first temperature measurement module, a movable structure, a second temperature measurement module and an information display module. The signal control module is disposed inside the device main body. The first temperature measurement module is disposed inside the device main body and electrically connected to the signal control module for measuring a first predetermined object so as to obtain first temperature information of the first predetermined object. The movable structure is movably disposed on the device main body. The second temperature measurement module is disposed inside the movable structure and electrically connected to the signal control module for measuring a second predetermined object so as to obtain second temperature information of the second predetermined object. The information display module is disposed on the device main body and electrically connected to the signal control module for displaying at least one of the first temperature information of the first predetermined object obtained by the first temperature measurement module and the second temperature information of the second predetermined object obtained by the second temperature measurement module. At least one portion of the movable structure is exposed by the device main body so as to contact ambient air.

In another aspect, the present disclosure provides a dual-purpose temperature measuring device, which includes a device main body, a signal control module, a first temperature measurement module, a movable structure, a second temperature measurement module and an information display module. The signal control module is disposed inside the device main body. The first temperature measurement module is disposed inside the device main body and electrically connected to the signal control module. The movable structure is movably disposed on the device main body. The second temperature measurement module is disposed inside the movable structure and electrically connected to the signal control module. The information display module is disposed on the device main body and electrically connected to the signal control module.

In yet another aspect, the present disclosure provides a dual-purpose temperature measuring device, which includes a device main body, a signal control module, a first temperature measurement module, a movable structure and a second temperature measurement module. The signal control module is disposed inside the device main body. The first temperature measurement module is disposed inside the device main body and electrically connected to the signal control module. The movable structure is movably disposed on the device main body. The second temperature measurement module is disposed inside the movable structure and electrically connected to the signal control module. At least one portion of the movable structure is exposed by the device main body so as to contact ambient air.

In one of the preferred embodiments, the device main body has an accommodating space formed therein and corresponding to the movable structure, the device main body includes a pivot structure disposed inside the accommodating space, the movable structure has a pivot portion cooperating with the pivot structure, and the movable structure is pivotally connected to the device main body through cooperation of the pivot portion and the pivot structure.

In one of the preferred embodiments, the movable structure has an exposed metal element, and the second temperature measurement module is disposed inside the exposed metal element of the movable structure.

In one of the preferred embodiments, the first temperature measurement module is an infrared sensor including both a thermopile and a thermistor, and the second temperature measurement module is an ambient temperature sensor including another thermistor.

In one of the preferred embodiments, the dual-purpose temperature measuring device further includes a battery module disposed inside the device main body and electrically connected to the signal control module, and the first temperature measurement module, the second temperature measurement module and the information display module are all electrically connected to the battery module through the signal control module.

In one of the preferred embodiments, the first predetermined object and the second predetermined object are the same or different.

In one of the preferred embodiments, when the movable structure is completely accommodated in the accommodating space of the device main body through rotation of the movable structure relative to the device main body, a thermistor of the first temperature measurement module is configured to measure a temperature of a thermopile of the first temperature measurement module so as to obtain module temperature information of the thermopile of the first temperature measurement module, and the second temperature measurement module is configured to measure a temperature of an environmental space surrounding the dual-purpose temperature measuring device so as to obtain ambient temperature information of the environmental space.

In one of the preferred embodiments, when the movable structure is completely accommodated in the accommodating space of the device main body through rotation of the movable structure relative to the device main body, a side portion of the exposed metal element of the movable structure is exposed by the device main body so as to contact the ambient air.

In one of the preferred embodiments, when the movable structure is completely accommodated in the accommodating space of the device main body through rotation of the movable structure relative to the device main body, and when 10° C.≤T2≤40° C., |T2−T1|≤0.3° C. and |ΔT2/min|≤1° C., a measurement accuracy of the first temperature measurement module for the first predetermined object is maintained within a predetermined standard range, so that the dual-purpose temperature measuring device is allowed to use the thermopile of the first temperature measurement module to measure a temperature of the first predetermined object, in which T1 is a first temperature value provided by the module temperature information, T2 is an ambient temperature value provided by the ambient temperature information, and ΔT2 is a temperature change rate of the ambient temperature value.

In one of the preferred embodiments, when the movable structure is partially disposed outside the accommodating space of the device main body through rotation of the movable structure relative to the device main body, the second temperature measurement module is configured to measure the second predetermined object so as to obtain the second temperature information of the second predetermined object.

In one of the preferred embodiments, when the exposed metal element of the movable structure is moved to a predetermined position outside the accommodating space of the device main body, the signal control module, the movable structure, the second temperature measurement module and the information display module cooperate with each other to serve as an oral thermometer or a rectal thermometer.

Therefore, in the dual-purpose temperature measuring device provided by the present disclosure, one beneficial effect of the present disclosure is that the user can selectively use one of the first temperature measurement module and the second temperature measurement module to measure the temperature of the same predetermined object or different predetermined objects according to different requirements, by virtue of "the first temperature measurement module being disposed inside the device main body and electrically connected to the signal control module," "the movable structure being configured to be movably disposed on the device main body" and "the second temperature measurement module being disposed inside the movable structure and electrically connected to the signal control module."

That is to say, when the movable structure is completely accommodated in the accommodating space of the device main body through rotation of the movable structure relative to the device main body, the first temperature measurement module can be configured to "use a thermopile to measure a first predetermined object so as to obtain first temperature information of the first predetermined object" and "use a thermistor to measure a temperature of the thermopile of the first temperature measurement module so as to obtain module temperature information of the thermopile of the first temperature measurement module," and the second temperature measurement module can be configured to measure a temperature of an environmental space surrounding the dual-purpose temperature measuring device so as to obtain ambient temperature information of the environmental space. Moreover, when the movable structure is partially disposed outside the accommodating space of the device main body through rotation of the movable structure relative to the device main body, the second temperature measurement module can be configured to measure the second predetermined object so as to obtain the second temperature information of the second predetermined object.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
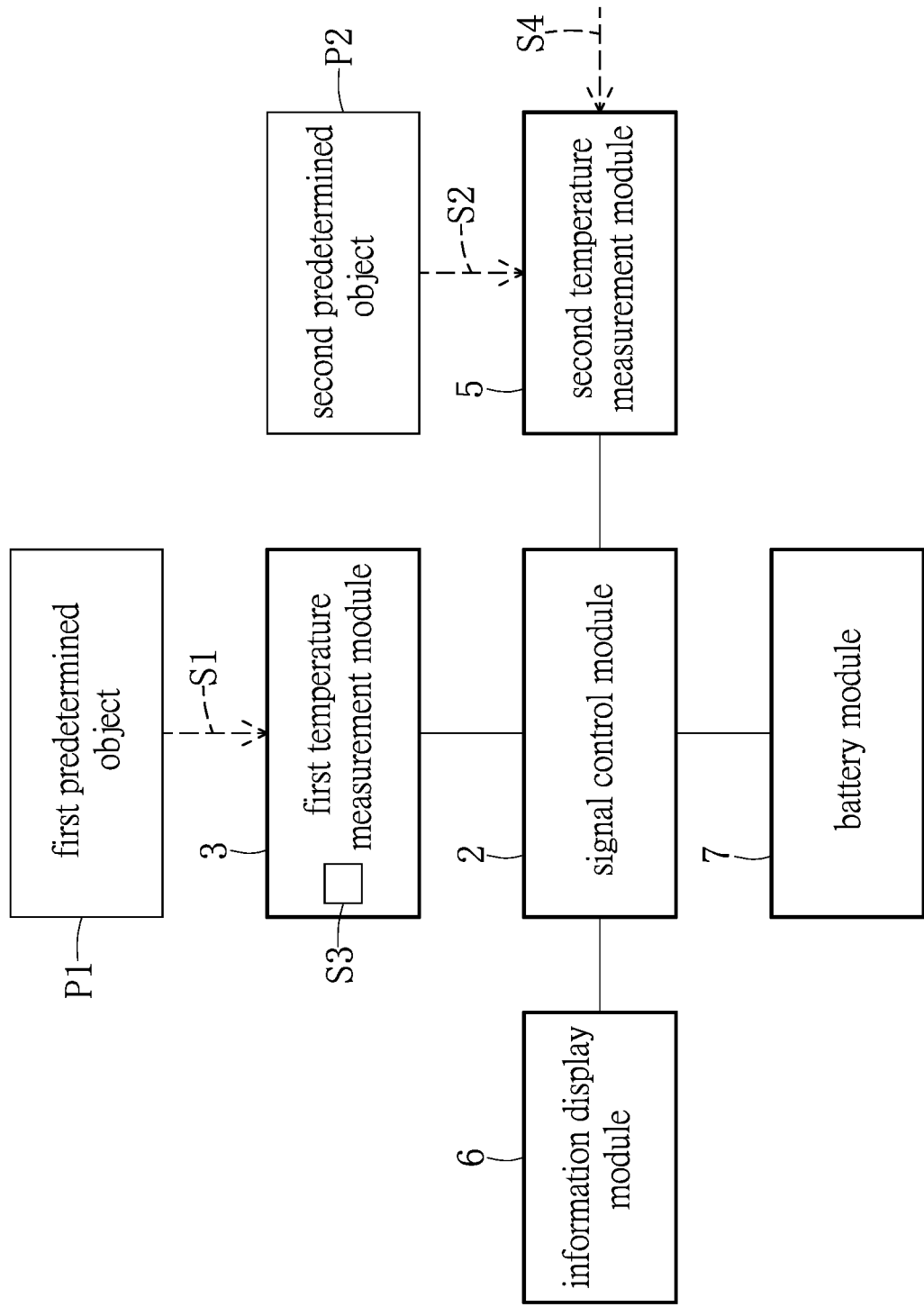
FIG. 1 is a functional block diagram of a dual-purpose temperature measuring device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Referring to FIG. 1 to FIG. 4, the present disclosure provides a dual-purpose temperature measuring device D, which includes a device main body 1, a signal control module 2, a first temperature measurement module 3, a movable structure 4, a second temperature measurement module 5 and an information display module 6. More particularly, the signal control module 2 can be configured to be disposed inside the device main body 1. The first temperature measurement module 3 can be configured to be disposed inside the device main body 1 and electrically connected to the signal control module 2. The movable structure 4 can be configured to be movably disposed on the device main body 1. The second temperature measurement module 5 can be configured to be disposed inside the movable structure 4 and electrically connected to the signal control module 2. The information display module 6 can be configured to be disposed on the device main body 1 and electrically connected to the signal control module 2.

Referring to FIG. 5 to FIG. 8, the present disclosure provides a dual-purpose temperature measuring device D, which includes a device main body 1, a first signal control module 2A, a first temperature measurement module 3, a detachable structure 8, a second signal control module 2B, a second temperature measurement module 5, a first information display module 6A and a second information display module 6B. More particularly, the first signal control module 2A can be configured to be disposed inside the device main body 1. The first temperature measurement module 3 can be configured to be disposed inside the device main body 1 and electrically connected to the first signal control module 2A. The detachable structure 8 can be configured to be detachably disposed on the device main body 1. The second signal control module 2B can be configured to be disposed inside the detachable structure 8 and electrically connected to the first signal control module 2A. The second temperature measurement module 5 can be configured to be disposed inside the detachable structure 8 and electrically connected to the second signal control module 2B. The first information display module 6A can be configured to be disposed on the device main body 1 and electrically connected to the first signal control module 2A. The second information display module 6B can be configured to be disposed on the detachable structure 8 and electrically connected to the second signal control module 2B.

First Embodiment

Referring to FIG. 1 to FIG. 4, a first embodiment of the present disclosure provides a dual-purpose temperature measuring device D, which includes a device main body 1, a signal control module 2, a first temperature measurement module 3, a movable structure 4 (or a rotatable structure, or a linearly movable structure), a second temperature measurement module 5 and an information display module 6.

Figure 2:
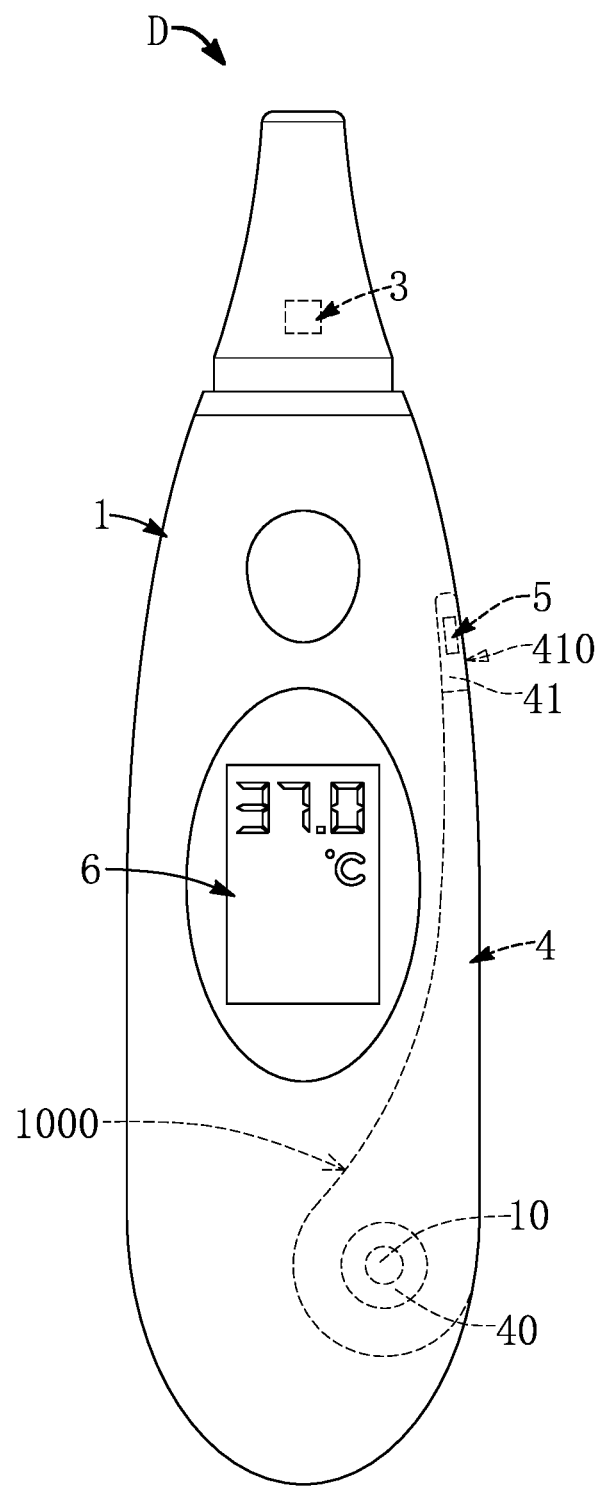
FIG. 2 is a schematic front view of the dual-purpose temperature measuring device according to the first embodiment of the present disclosure (when the movable structure is completely accommodated inside the device main body)

Firstly, referring to FIG. 1 and FIG. 2, the signal control module 2 can be configured to be disposed inside the device main body 1, and the first temperature measurement module 3 can be configured to be disposed inside the device main body 1 and electrically connected to the signal control module 2 for measuring a first predetermined object P1 (i.e., a first object to be tested, such as a human body, an animal or an environment) so as to obtain first temperature information S1 (such as an ear temperature, a forehead temperature or an ambient temperature) of the first predetermined object P1. For example, the first temperature measurement module 3 can be configured to be disposed at the front end of the device main body 1. In addition, the first temperature measurement module 3 can be an infrared sensor (or an infrared sensor package component) including both a thermopile and a thermistor (for example, the thermopile and the thermistor can be packaged inside the first temperature measurement module 3), and the first temperature measurement module 3 does not include other temperature sensing chips except for the thermopile and the thermistor. However, the aforementioned description is merely an example, and is not meant to limit the scope of the present disclosure.

Figure 4:
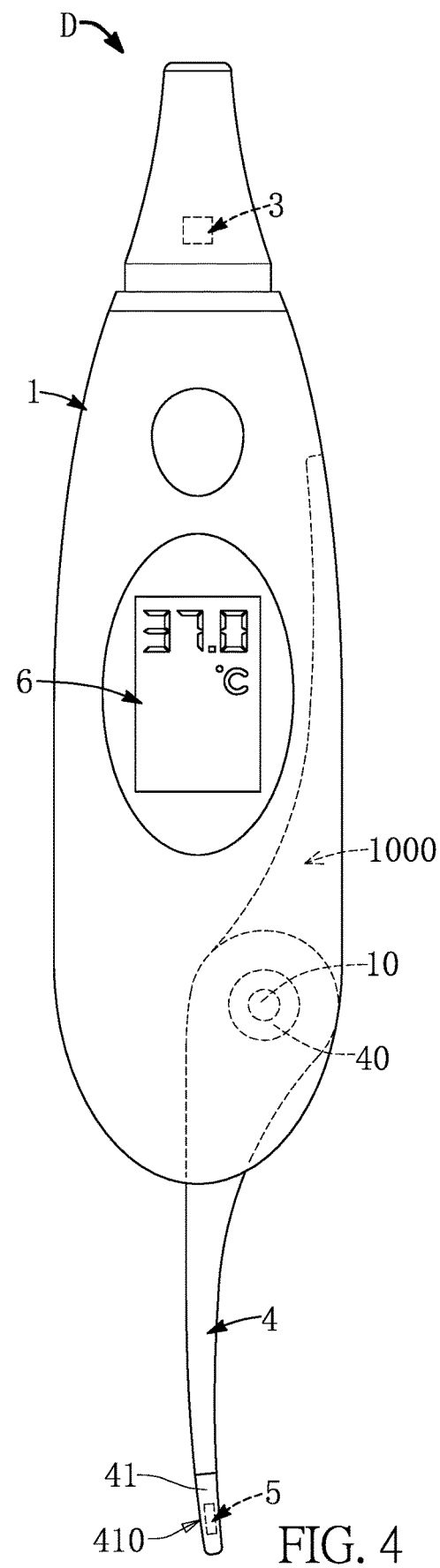
FIG. 4 is a schematic front view of the dual-purpose temperature measuring device according to the first embodiment of the present disclosure (when the movable structure is partially exposed from the device main body)

Moreover, referring to FIG. 1, FIG. 2 and FIG. 4, the movable structure 4 can be configured to be movably disposed on the device main body 1, and the second temperature measurement module 5 can be configured to be disposed inside the movable structure 4 and electrically connected to the signal control module 2 for measuring a second predetermined object P2 (i.e., a second object to be tested, such as a human or an animal) so as to obtain second temperature information S2 (such as an oral temperature or a rectal temperature) of the second predetermined object P2. For example, the device main body 1 has an accommodating space 1000 (or a receiving space) formed therein and corresponding to the movable structure 4 and a pivot structure 10 disposed inside the accommodating space 1000. Moreover, the movable structure 4 has a pivot portion 40 cooperating with the pivot structure 10, and the movable structure 4 can be pivotally connected to the device main body 1 through cooperation of the pivot portion 40 and the pivot structure 10. Furthermore, the movable structure 4 has an exposed metal element 41, and the second temperature measurement module 5 can be configured to be disposed inside the exposed metal element 41 of the movable structure 4. In addition, the second temperature measurement module 5 can be an ambient temperature sensor (or an ambient temperature sensor package component) including another thermistor. However, the aforementioned description is merely an example, and is not meant to limit the scope of the present disclosure.

Furthermore, referring to FIG. 1 and FIG. 2, the information display module 6 can be configured to be disposed on the device main body 1 and electrically connected to the signal control module 2 for displaying "the first temperature information S1 of the first predetermined object P1 obtained by the first temperature measurement module 3" or "the second temperature information S2 of the second predetermined object P2 obtained by the second temperature measurement module 5." For example, the information display module 6 can be any kind of display such as an LCD display or an LED display. However, the aforementioned description is merely an example, and is not meant to limit the scope of the present disclosure.

In addition, as shown in FIG. 1, the dual-purpose temperature measuring device D further includes a battery module 7, in which the battery module 7 can be configured to be disposed inside the device main body 1 and electrically connected to the signal control module 2, and the first temperature measurement module 3, the second temperature measurement module 5 and the information display module 6 can all be electrically connected to the battery module 7 through the signal control module 2. For example, the battery module 7 can be any kind of battery such as a replaceable battery or a stationary battery. However, the aforementioned description is merely an example, and is not meant to limit the scope of the present disclosure.

Figure 3:
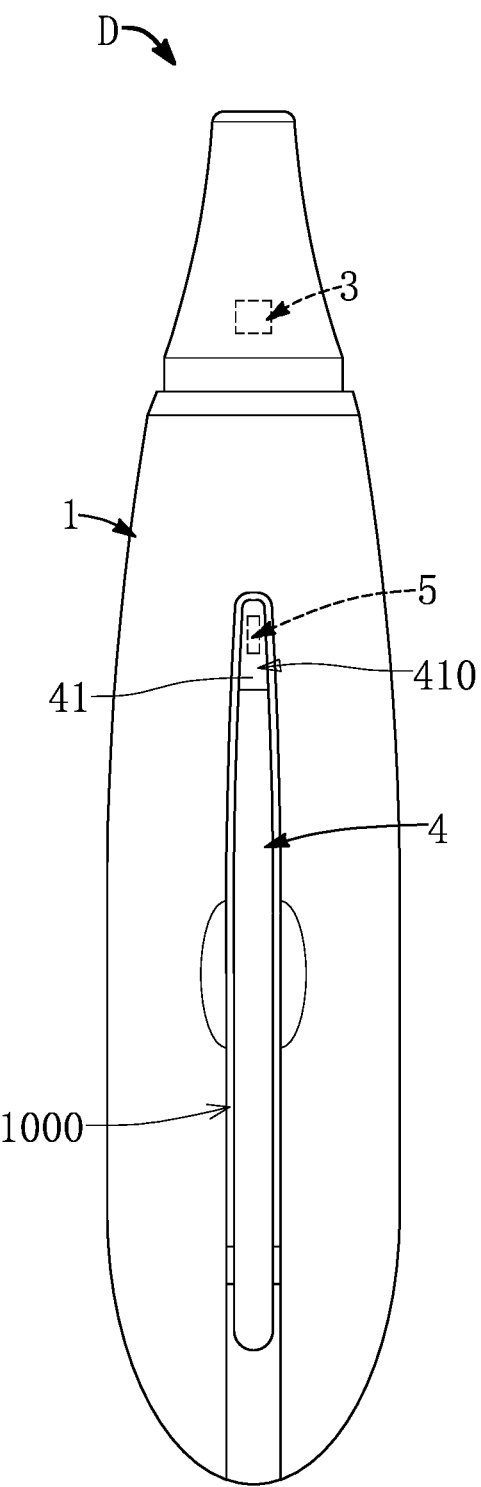
FIG. 3 is a schematic side view of the dual-purpose temperature measuring device according to the first embodiment of the present disclosure.

Moreover, referring to FIG. 1, FIG. 2 and FIG. 3, at least one portion of the movable structure 4 can be exposed by the device main body 1 so as to contact ambient air (or an ambient atmosphere). For example, when the movable structure 4 is completely accommodated in the accommodating space 1000 of the device main body 1 through rotation of the movable structure 4 relative to the device main body 1 (as shown in FIG. 2), a side portion 410 (or a lateral surface) of the exposed metal element 41 of the movable structure 4 can be exposed by the device main body 1 so as to contact the ambient air (as shown in FIG. 2 and FIG. 3). In addition, when the movable structure 4 is completely accommodated in the accommodating space 1000 of the device main body 1 through rotation of the movable structure 4 relative to the device main body 1 (as shown in FIG. 2), the thermistor of the first temperature measurement module 3 can be configured to measure a temperature of the thermopile of the first temperature measurement module 3 so as to obtain module temperature information S3 of the thermopile of the first temperature measurement module 3, and the second temperature measurement module 5 can be configured to measure a temperature of an environmental space surrounding the dual-purpose temperature measuring device D (due to the side portion 410 of the exposed metal element 41 of the movable structure 4 that is exposed by the device main body 1 so as to contact the ambient air) so as to obtain ambient temperature information S4 of the environmental space. However, the aforementioned description is merely an example, and is not meant to limit the scope of the present disclosure.

It should be noted that, for example, as shown in FIG. 2, when the movable structure 4 is completely accommodated in the accommodating space 1000 of the device main body 1 through rotation of the movable structure 4 relative to the device main body 1, and when $10°\ C. \leq T2 \leq 40°\ C.$, $|T2-T1| \leq 0.3°\ C.$ and $|\Delta T2/min| \leq 1°\ C.$, a measurement accuracy of the first temperature measurement module 3 for the first predetermined object P1 can be maintained within a predetermined standard range, so that the dual-purpose temperature measuring device D can be allowed to use the thermopile of the first temperature measurement module 3 to measure a temperature of the first predetermined object P1 (in other words, the user can be allowed to use the thermopile of the first temperature measurement module 3 of the dual-purpose temperature measuring device D to measure the temperature of the first predetermined object P1), in which T1 is a first temperature value (i.e., a first temperature value generated by the first temperature measurement module 3) provided by the module temperature information S3, T2 is an ambient temperature value (i.e., a second temperature value) provided by the ambient temperature information S4, and $\Delta T2$ is a temperature change rate of the ambient temperature value. In addition, T2−T1 refers to a temperature error value between the module temperature of the first temperature measurement module 3 and the ambient temperature of the second temperature measurement module 5 (i.e., a difference value between the first temperature value and the second temperature value), and the user can predict whether the dual-purpose temperature measuring device D can be used normally through the temperature error value. In other words, when the dual-purpose temperature measuring device D satisfies the conditions of $10°\ C. \leq T2 \leq 40°\ C.$, $|T2-T1| \leq 0.3°\ C.$ and $|\Delta T2/min| \leq 1°\ C.$, the dual-purpose temperature measuring device D can provide reminder information (such as text, audio or video) to inform the user that the dual-purpose temperature measuring device D can be used normally so as to save the user's unpredictable waiting time. However, the aforementioned description is merely an example, and is not meant to limit the scope of the present disclosure.

It should be noted that, for example, as shown in FIG. 1, FIG. 2 and FIG. 4, when the movable structure 4 is partially disposed outside the accommodating space 1000 of the device main body 1 through rotation of the movable structure 4 relative to the device main body 1 (that is to say, a portion of the movable structure 4 is exposed outside the device main body 1), the second temperature measurement module 5 can be configured to measure the second predetermined object P2 so as to obtain the second temperature information S2 of the second predetermined object P2. More particularly, when the exposed metal element 41 of the movable structure 4 is moved to a predetermined position outside the accommodating space 1000 of the device main body 1, the signal control module 2, the movable structure 4, the second temperature measurement module 5 and the information display module 6 can cooperate with each other to serve as an oral thermometer or a rectal thermometer. That is to say, when the movable structure 4 is partially disposed outside the accommodating space 1000 of the device main body 1 through rotation of the movable structure 4 relative to the device main body 1, the dual-purpose temperature measuring device D can be configured to measure an oral temperature or a rectal temperature through the second temperature measurement module 5. However, the aforementioned description is merely an example, and is not meant to limit the scope of the present disclosure.

It should be noted that, for example, the first predetermined object P1 and the second predetermined object P2 can be the same or different. That is to say, the first predetermined object P1 and the second predetermined object P2 can refer to the same object or two different objects. However, the aforementioned description is merely an example, and is not meant to limit the scope of the present disclosure.

Second Embodiment

Referring to FIG. 5 to FIG. 8, a second embodiment of the present disclosure provides a dual-purpose temperature measuring device D, which includes a device main body 1, a first signal control module 2A, a first temperature measurement module 3, a detachable structure 8, a second signal control module 2B, a second temperature measurement module 5, a first information display module 6A and a second information display module 6B.

Figure 5:
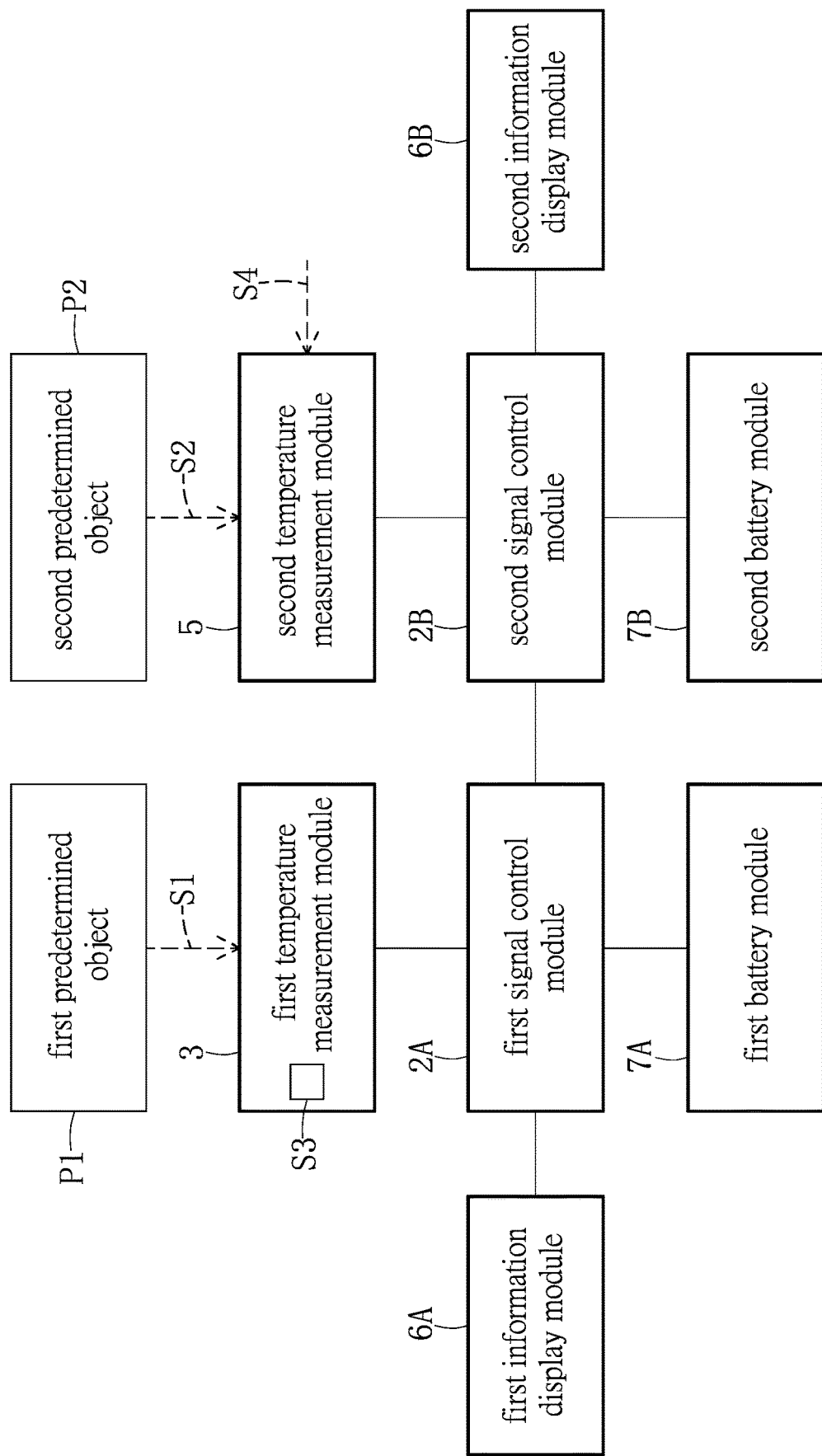
FIG. 5 is a functional block diagram of the dual-purpose temperature measuring device according to a second embodiment of the present disclosure.
Figure 6:
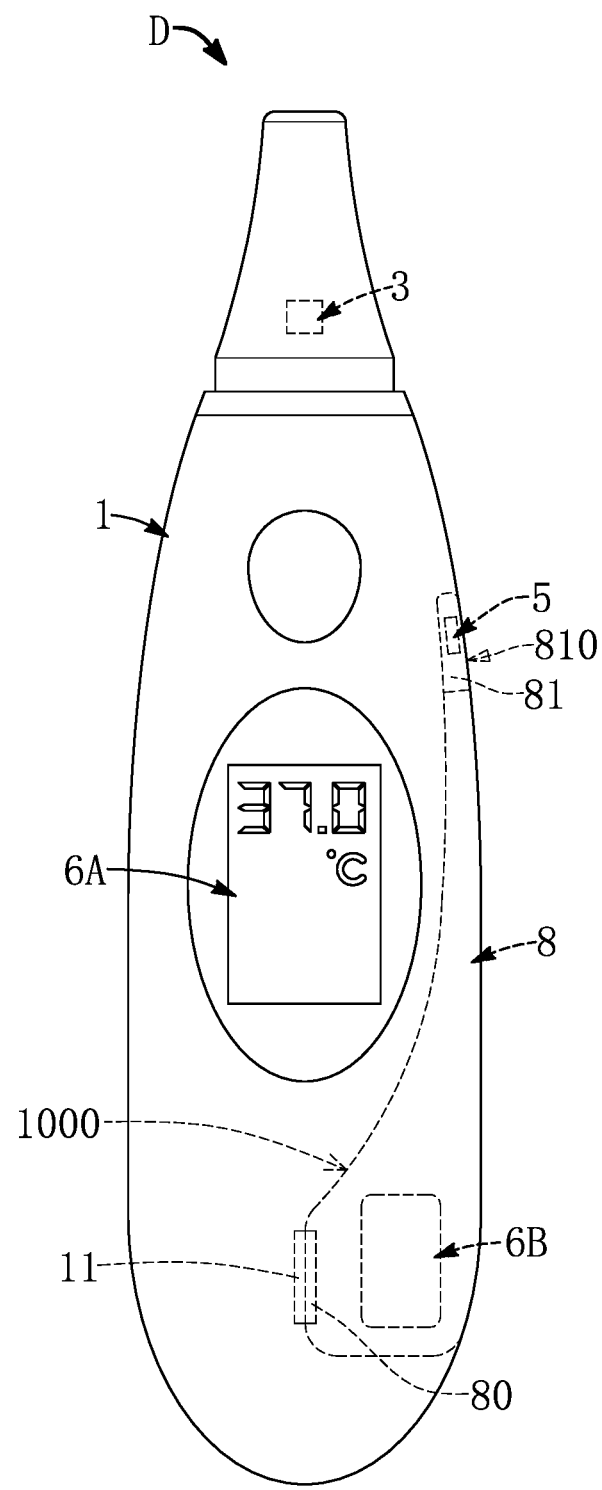
FIG. 6 is a schematic front view of the dual-purpose temperature measuring device according to the second embodiment of the present disclosure (when the movable structure is completely accommodated inside the device main body)

Firstly, referring to FIG. 5 and FIG. 6, the first signal control module 2A can be configured to be disposed inside the device main body 1, and the first temperature measurement module 3 can be configured to be disposed inside the device main body 1 and electrically connected to the first signal control module 2A for measuring a first predetermined object P1 (i.e., a first object to be tested, such as a human body, an animal or an environment) so as to obtain first temperature information S1 (such as an ear temperature, a forehead temperature or an ambient temperature) of the first predetermined object P1. For example, the first temperature measurement module 3 can be configured to be disposed at the front end of the device main body 1. In addition, the first temperature measurement module 3 can be an infrared sensor (or an infrared sensor package component) including both a thermopile and a thermistor, and the first temperature measurement module 3 does not include other temperature sensing chips except for the thermopile and the thermistor. However, the aforementioned description is merely an example, and is not meant to limit the scope of the present disclosure.

Figure 8:
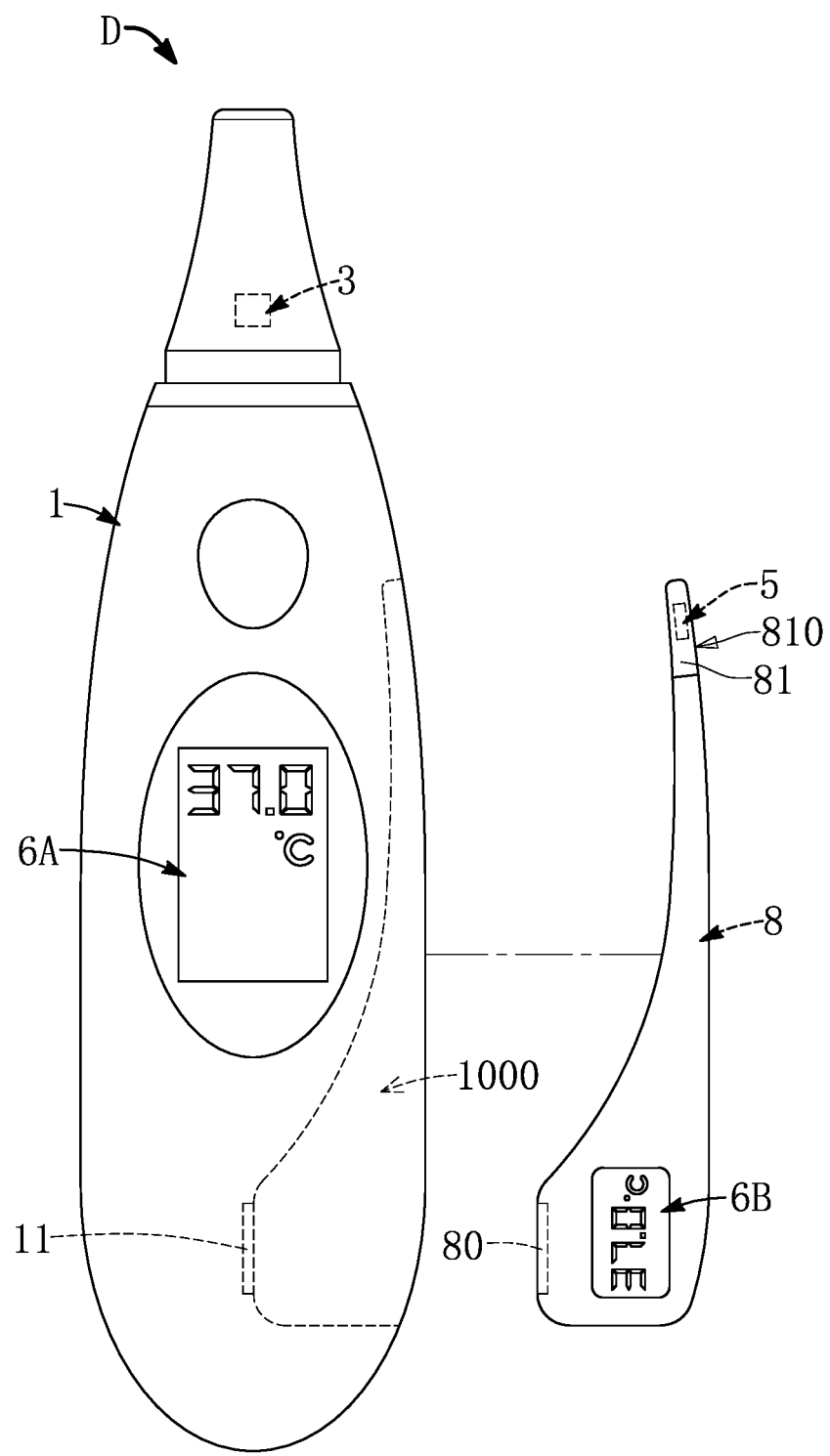
FIG. 8 is a schematic front view of the dual-purpose temperature measuring device according to the second embodiment of the present disclosure (when the movable structure is completely exposed from the device main body).

Moreover, referring to FIG. 5, FIG. 6 and FIG. 8, the detachable structure 8 can be configured to be detachably disposed on the device main body 1, the second signal control module 2B can be configured to be disposed inside the detachable structure 8 and electrically connected to the first signal control module 2A, and the second temperature measurement module 5 can be configured to be disposed inside the detachable structure 8 and electrically connected to the second signal control module 2B for measuring a second predetermined object P2 (i.e., a second object to be tested, such as a human or an animal) so as to obtain second temperature information S2 (such as an oral temperature or a rectal temperature) of the second predetermined object P2. For example, the device main body 1 has an accommodating space 1000 (or a receiving space) formed therein and corresponding to the detachable structure 8 and an electrical connector structure 11 disposed inside the accommodating space 1000. Moreover, the detachable structure 8 has a conductive connecting portion 80 cooperating with the electrical connector structure 11, and the detachable structure 8 can be electrically connected to the device main body 1 through contact of the conductive connecting portion 80 and the electrical connector structure 11 (for example, by means of buckle or magnetic attraction between the conductive connecting portion 80 and the electrical connector structure 11). Furthermore, the detachable structure 8 has an exposed metal element 81, and the second temperature measurement module 5 can be configured to be disposed inside the exposed metal element 81 of the detachable structure 8. In addition, the second temperature measurement module 5 can be an ambient temperature sensor (or an ambient temperature sensor package component) including another thermistor. However, the aforementioned description is merely an example, and is not meant to limit the scope of the present disclosure.

Furthermore, referring to FIG. 5 and FIG. 6, the first information display module 6A can be configured to be disposed on the device main body 1 and electrically connected to the first signal control module 2A for displaying the first temperature information S1 of the first predetermined object P1 obtained by the first temperature measurement module 3. In addition, the second information display module 6B can be configured to be disposed on the detachable structure 8 and electrically connected to the second signal control module 2B for displaying the second temperature information S2 of the second predetermined object P2 obtained by the second temperature measurement module 5. For example, each of the first information display module 6A and the second information display module 6B can be any kind of display such as an LCD display or an LED display. However, the aforementioned description is merely an example, and is not meant to limit the scope of the present disclosure.

In addition, as shown in FIG. 5, the dual-purpose temperature measuring device D further includes a first battery module 7A and a second battery module 7B. The first battery module 7A can be configured to be disposed inside the device main body 1 and electrically connected to the first signal control module 2A, and the first temperature measurement module 3 and the first information display module 6A can all be electrically connected to the first battery module 7A through the first signal control module 2A. Moreover, the second battery module 7B can be configured to be disposed inside the detachable structure 8 and electrically connected to the second signal control module 2B, and the second temperature measurement module 5 and the second information display module 6B can all be electrically connected to the second battery module 7B through the second signal control module 2B. For example, each of the first battery module 7A and the second battery module 7B can be any kind of battery such as a replaceable battery or a stationary battery. However, the aforementioned description is merely an example, and is not meant to limit the scope of the present disclosure.

Figure 7:
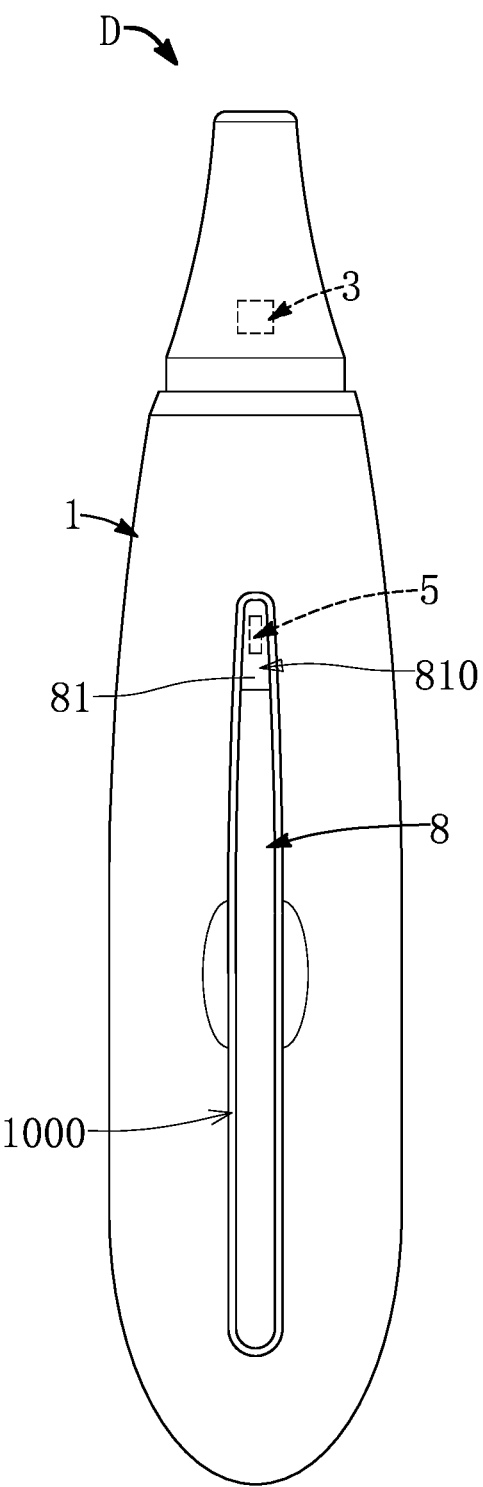
FIG. 7 is a schematic side view of the dual-purpose temperature measuring device according to the second embodiment of the present disclosure.

Moreover, referring to FIG. 5, FIG. 6 and FIG. 7, at least one portion of the detachable structure 8 can be exposed by the device main body 1 so as to contact ambient air (or an ambient atmosphere). For example, when the detachable structure 8 is completely accommodated in the accommodating space 1000 of the device main body 1 through movement of the detachable structure 8 relative to the device main body 1 (as shown in FIG. 6), a side portion 810 (or a lateral surface) of the exposed metal element 81 of the detachable structure 8 can be exposed by the device main body 1 so as to contact the ambient air (as shown in FIG. 6 and FIG. 7). In addition, when the detachable structure 8 is completely accommodated in the accommodating space 1000 of the device main body 1 through movement of the detachable structure 8 relative to the device main body 1 (as shown in FIG. 6), the thermistor of the first temperature measurement module 3 can be configured to measure a temperature of the thermopile of the first temperature measurement module 3 so as to obtain module temperature information S3 of the thermopile of the first temperature measurement module 3, and the second temperature measurement module 5 can be configured to measure a temperature of an environmental space surrounding the dual-purpose temperature measuring device D (due to the side portion 810 of the exposed metal element 81 of the movable structure 8 that is exposed by the device main body 1 so as to contact the ambient air) so as to obtain ambient temperature information S4 of the environmental space. However, the aforementioned description is merely an example, and is not meant to limit the scope of the present disclosure.

It should be noted that, for example, as shown in FIG. 6, when the detachable structure 8 is completely accommodated in the accommodating space 1000 of the device main body 1 through movement of the detachable structure 8 relative to the device main body 1, and when $10° C. \leq T2 \leq 40° C.$, $|T2-T1| \leq 0.3° C.$ and $|\Delta T2/min| \leq 1° C.$, a measurement accuracy of the first temperature measurement module 3 for the first predetermined object P1 can be maintained within a predetermined standard range, so that the dual-purpose temperature measuring device D can be allowed to use the thermopile of the first temperature measurement module 3 to measure a temperature of the first predetermined object P1 (in other words, the user can be allowed to use the thermopile of the first temperature measurement module 3 of the dual-purpose temperature measuring device D to measure the temperature of the first predetermined object P1), in which T1 is a first temperature value (i.e., a first temperature value generated by the first temperature measurement module 3) provided by the module temperature information S3, T2 is an ambient temperature value (i.e., a second temperature value) provided by the ambient temperature information S4, and $\Delta T2$ is a temperature change rate of the ambient temperature value. In addition, T2−T1 refers to a temperature error value between the module temperature of the first temperature measurement module 3 and the ambient temperature of the second temperature measurement module 5 (i.e., a difference value between the first temperature value and the second temperature value), and the user can predict whether the dual-purpose temperature measuring device D can be used normally through the temperature error value. In other words, when the dual-purpose temperature measuring device D satisfies the conditions of 10° C.≤T2≤40° C., |T2−T1|≤0.3° C. and |ΔT2/min|≤1° C., the dual-purpose temperature measuring device D can provide reminder information (such as text, audio or video) to inform the user that the dual-purpose temperature measuring device D can be used normally so as to save the user's unpredictable waiting time. However, the aforementioned description is merely an example, and is not meant to limit the scope of the present disclosure.

It should be noted that, for example, as shown in FIG. 5, FIG. 6 and FIG. 8, when the detachable structure 8 is completely disposed outside the accommodating space 1000 of the device main body 1 through movement of the detachable structure 8 relative to the device main body 1, the second temperature measurement module 5 can be configured to measure the second predetermined object P2 so as to obtain the second temperature information S2 of the second predetermined object P2. More particularly, when the detachable structure 8 is completely disposed outside the accommodating space 1000 of the device main body 1 through movement of the detachable structure 8 relative to the device main body 1, the detachable structure 8, the second signal control module 2B, the second temperature measurement module 5 and the second information display module 6B can cooperate with each other to serve as an oral thermometer or a rectal thermometer. That is to say, when the detachable structure 8 is completely disposed outside the accommodating space 1000 of the device main body 1 through movement of the detachable structure 8 relative to the device main body 1, the dual-purpose temperature measuring device D can not only measure an oral temperature or a rectal temperature through the second temperature measurement module 5, but can also display the oral temperature or the rectal temperature through the second information display module 6B. However, the aforementioned description is merely an example, and is not meant to limit the scope of the present disclosure.

It should be noted that, for example, the first predetermined object P1 and the second predetermined object P2 can be the same or different. That is to say, the first predetermined object P1 and the second predetermined object P2 can refer to the same object or two different objects. However, the aforementioned description is merely an example, and is not meant to limit the scope of the present disclosure.

Beneficial Effects of the Embodiments

In conclusion, in the dual-purpose temperature measuring device D provided by the present disclosure, by virtue of "the first temperature measurement module 3 being disposed inside the device main body 1 and electrically connected to the signal control module 2," "the movable structure 4 being configured to be movably disposed on the device main body 1" and "the second temperature measurement module 5 being disposed inside the movable structure 4 and electrically connected to the signal control module 2," the user can selectively use one of the first temperature measurement module 3 and the second temperature measurement module 5 to measure the temperature of the same predetermined object or different predetermined objects according to different requirements.

That is to say, when the movable structure 4 is completely accommodated in the accommodating space 1000 of the device main body 1 through rotation of the movable structure 4 relative to the device main body 1, the first temperature measurement module 3 can be configured to "use the thermopile to measure a first predetermined object P1 so as to obtain first temperature information S1 of the first predetermined object P1" and "use the thermistor to measure a temperature of the thermopile of the first temperature measurement module 3 so as to obtain module temperature information S3 of the thermopile of the first temperature measurement module 3," and the second temperature measurement module 5 can be configured to measure a temperature of an environmental space surrounding the dual-purpose temperature measuring device D so as to obtain ambient temperature information S4 of the environmental space. Moreover, when the movable structure 4 is partially disposed outside the accommodating space 1000 of the device main body 1 through rotation of the movable structure 4 relative to the device main body 1, the second temperature measurement module 5 can be configured to measure the second predetermined object P2 so as to obtain the second temperature information S2 of the second predetermined object P2.

It should be noted that, when the dual-purpose temperature measuring device D satisfies the conditions of 10° C.≤T2≤40° C., |T2−T1|≤0.3° C. and |ΔT2/min|≤1° C., the dual-purpose temperature measuring device D can provide reminder information (such as text, audio or video) to inform the user that the dual-purpose temperature measuring device D can be used normally so as to save the user's unpredictable waiting time.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:
1. A dual-purpose temperature measuring device, comprising:
 a device main body;
 a signal control module disposed inside the device main body;
 a first temperature measurement module disposed inside the device main body and electrically connected to the signal control module for measuring a first predetermined object so as to obtain first temperature information of the first predetermined object;
 a movable structure movably disposed on the device main body;
 a second temperature measurement module disposed inside the movable structure and electrically connected to the signal control module for measuring a second predetermined object so as to obtain second temperature information of the second predetermined object; and an information display module disposed on the device main body and electrically connected to the signal control module for displaying at least one of the first temperature information of the first predetermined object obtained by the first temperature measurement module and the second temperature information of the second predetermined object obtained by the second temperature measurement module;

wherein at least one portion of the movable structure is exposed by the device main body so as to contact ambient air;

wherein, when the movable structure is completely accommodated in a accommodating space of the device main body through rotation of the movable structure relative to the device main body, a thermistor of the first temperature measurement module is configured to measure a temperature of a thermopile of the first temperature measurement module so as to obtain module temperature information of the thermopile of the first temperature measurement module, and the second temperature measurement module is configured to measure a temperature of an environmental space surrounding the dual-purpose temperature measuring device so as to obtain ambient temperature information of the environmental space.

2. The dual-purpose temperature measuring device according to claim 1,
wherein the device main body has the accommodating space formed therein and corresponding to the movable structure, the device main body includes a pivot structure disposed inside the accommodating space, the movable structure has a pivot portion cooperating with the pivot structure, and the movable structure is pivotally connected to the device main body through cooperation of the pivot portion and the pivot structure;
wherein the movable structure has an exposed metal element, and the second temperature measurement module is disposed inside the exposed metal element of the movable structure;
wherein the second temperature measurement module is an ambient temperature sensor including another thermistor;
wherein the dual-purpose temperature measuring device further includes a battery module disposed inside the device main body and electrically connected to the signal control module, and the first temperature measurement module, the second temperature measurement module and the information display module are all electrically connected to the battery module through the signal control module;
wherein the first predetermined object and the second predetermined object are the same or different.

3. The dual-purpose temperature measuring device according to claim 1,
wherein the device main body has the accommodating space formed therein and corresponding to the movable structure, the movable structure has an exposed metal element, and the second temperature measurement module is disposed inside the exposed metal element of the movable structure;
wherein, when the movable structure is completely accommodated in the accommodating space of the device main body through rotation of the movable structure relative to the device main body, a side portion of the exposed metal element of the movable structure is exposed by the device main body so as to contact the ambient air;
wherein, when the movable structure is completely accommodated in the accommodating space of the device main body through rotation of the movable structure relative to the device main body, and when $10°C. \leq T2 \leq 40°C.$, $|T2-T1| \leq 0.3°C.$ and $|\Delta T2/min| \leq 1°C.$, a measurement accuracy of the first temperature measurement module for the first predetermined object is maintained within a predetermined standard range, so that the dual-purpose temperature measuring device is allowed to use the thermopile of the first temperature measurement module to measure a temperature of the first predetermined object, wherein T1 is a first temperature value provided by the module temperature information, T2 is an ambient temperature value provided by the ambient temperature information, and $\Delta T2$ is a temperature change rate of the ambient temperature value.

4. The dual-purpose temperature measuring device according to claim 1,
wherein the device main body has the accommodating space formed therein and corresponding to the movable structure, the movable structure has an exposed metal element, and the second temperature measurement module is disposed inside the exposed metal element of the movable structure;
wherein, when the movable structure is partially disposed outside the accommodating space of the device main body through rotation of the movable structure relative to the device main body, the second temperature measurement module is configured to measure the second predetermined object so as to obtain the second temperature information of the second predetermined object;
wherein, when the exposed metal element of the movable structure is moved to a predetermined position outside the accommodating space of the device main body, the signal control module, the movable structure, the second temperature measurement module and the information display module cooperate with each other to serve as an oral thermometer or a rectal thermometer.

5. The dual-purpose temperature measuring device according to claim 1, wherein the thermistor and the thermopile of the first temperature measurement module are only disposed inside the device main bod and are not completely exposed outside the device body.

6. The dual-purpose temperature measuring device according to claim 1, wherein the thermistor of the first temperature measurement module is only configured to measure the temperature of the thermopile of the first temperature measurement module so as to obtain the module temperature information of the thermopile of the first temperature measurement module.

7. The dual-purpose temperature measuring device according to claim 1, wherein the second temperature measurement module is only configured to measure the temperature of the environmental space surrounding the dual-purpose temperature measuring device so as to obtain the ambient temperature information of the environmental space.

8. A dual-purpose temperature measuring device, comprising:
a device main body;
a signal control module disposed inside the device main body;

a first temperature measurement module disposed inside the device main body and electrically connected to the signal control module;
a movable structure movably disposed on the device main body;
a second temperature measurement module disposed inside the movable structure and electrically connected to the signal control module; and
an information display module disposed on the device main body and electrically connected to the signal control module;
wherein, when the movable structure is completely accommodated in a accommodating space of the device main body through rotation of the movable structure relative to the device main body, a thermistor of the first temperature measurement module is configured to measure a temperature of a thermopile of the first temperature measurement module so as to obtain module temperature information of the thermopile of the first temperature measurement module, and the second temperature measurement module is configured to measure a temperature of an environmental space surrounding the dual-purpose temperature measuring device so as to obtain ambient temperature information of the environmental space.

9. The dual-purpose temperature measuring device according to claim 8,
wherein the device main body has the accommodating space formed therein and corresponding to the movable structure, the device main body includes a pivot structure disposed inside the accommodating space, the movable structure has a pivot portion cooperating with the pivot structure, and the movable structure is pivotally connected to the device main body through cooperation of the pivot portion and the pivot structure;
wherein the movable structure has an exposed metal element, and the second temperature measurement module is disposed inside the exposed metal element of the movable structure;
wherein the second temperature measurement module is an ambient temperature sensor including another thermistor;
wherein the dual-purpose temperature measuring device further includes a battery module disposed inside the device main body and electrically connected to the signal control module, and the first temperature measurement module, the second temperature measurement module and the information display module are all electrically connected to the battery module through the signal control module.

10. The dual-purpose temperature measuring device according to claim 8,
wherein the device main body has the accommodating space formed therein and corresponding to the movable structure, the movable structure has an exposed metal element, and the second temperature measurement module is disposed inside the exposed metal element of the movable structure;
wherein, when the movable structure is completely accommodated in the accommodating space of the device main body through rotation of the movable structure relative to the device main body, the first temperature measurement module is configured to measure a first predetermined object so as to obtain first temperature information of the first predetermined object;
wherein, when the movable structure is completely accommodated in the accommodating space of the device main body through rotation of the movable structure relative to the device main body, a side portion of the exposed metal element of the movable structure is exposed by the device main body so as to contact the ambient air;
wherein, when the movable structure is completely accommodated in the accommodating space of the device main body through rotation of the movable structure relative to the device main body, and when 10° C.≤T2≤340° C., |T2−T1|≤0.3° C. and |ΔT2/min|≤1° C., a measurement accuracy of the first temperature measurement module for the first predetermined object is maintained within a predetermined standard range, so that the dual-purpose temperature measuring device is allowed to use the thermopile of the first temperature measurement module to measure a temperature of the first predetermined object, wherein T1 is a first temperature value provided by the module temperature information, T2 is an ambient temperature value provided by the ambient temperature information, and ΔT2 is a temperature change rate of the ambient temperature value.

11. The dual-purpose temperature measuring device according to claim 8,
wherein the device main body has the accommodating space formed therein and corresponding to the movable structure, the movable structure has an exposed metal element, and the second temperature measurement module is disposed inside the exposed metal element of the movable structure;
wherein, when the movable structure is partially disposed outside the accommodating space of the device main body through rotation of the movable structure relative to the device main body, the second temperature measurement module is configured to measure a second predetermined object so as to obtain second temperature information of the second predetermined object;
wherein, when the exposed metal element of the movable structure is moved to a predetermined position outside the accommodating space of the device main body, the signal control module, the movable structure, the second temperature measurement module and the information display module cooperate with each other to serve as an oral thermometer or a rectal thermometer.

12. The dual-purpose temperature measuring device according to claim 8, wherein the thermistor and the thermopile of the first temperature measurement module are only disposed inside the device main bod and are not completely exposed outside the device body.

13. The dual-purpose temperature measuring device according to claim 8, wherein the thermistor of the first temperature measurement module is only configured to measure the temperature of the thermopile of the first temperature measurement module so as to obtain the module temperature information of the thermopile of the first temperature measurement module.

14. The dual-purpose temperature measuring device according to claim 8, wherein the second temperature measurement module is only configured to measure the temperature of the environmental space surrounding the dual-purpose temperature measuring device so as to obtain the ambient temperature information of the environmental space.

15. A dual-purpose temperature measuring device, comprising:

a device main body;

a signal control module disposed inside the device main body;

a first temperature measurement module disposed inside the device main body and electrically connected to the signal control module;

a movable structure movably disposed on the device main body; and a second temperature measurement module disposed inside the movable structure and electrically connected to the signal control module;

wherein at least one portion of the movable structure is exposed by the device main body so as to contact ambient air;

wherein, when the movable structure is completely accommodated in a accommodating space of the device main body through rotation of the movable structure relative to the device main body, a thermistor of the first temperature measurement module is configured to measure a temperature of a thermopile of the first temperature measurement module so as to obtain module temperature information of the thermopile of the first temperature measurement module, and the second temperature measurement module is configured to measure a temperature of an environmental space surrounding the dual-purpose temperature measuring device so as to obtain ambient temperature information of the environmental space.

16. The dual-purpose temperature measuring device according to claim 15, wherein the device main body has the accommodating space formed therein and corresponding to the movable structure, the device main body includes a pivot structure disposed inside the accommodating space, the movable structure has a pivot portion cooperating with the pivot structure, and the movable structure is pivotally connected to the device main body through cooperation of the pivot portion and the pivot structure;

wherein the movable structure has an exposed metal element, and the second temperature measurement module is disposed inside the exposed metal element of the movable structure;

wherein the second temperature measurement module is an ambient temperature sensor including another thermistor;

wherein the dual-purpose temperature measuring device further includes a battery module disposed inside the device main body and electrically connected to the signal control module, and the first temperature measurement module and the second temperature measurement module are all electrically connected to the battery module through the signal control module.

17. The dual-purpose temperature measuring device according to claim 15, wherein the thermistor and the thermopile of the first temperature measurement module are only disposed inside the device main bod and are not completely exposed outside the device body.

18. The dual-purpose temperature measuring device according to claim 15, wherein the thermistor of the first temperature measurement module is only configured to measure the temperature of the thermopile of the first temperature measurement module so as to obtain the module temperature information of the thermopile of the first temperature measurement module.

19. The dual-purpose temperature measuring device according to claim 15, wherein the second temperature measurement module is only configured to measure the temperature of the environmental space surrounding the dual-purpose temperature measuring device so as to obtain the ambient temperature information of the environmental space.

20. The dual-purpose temperature measuring device according to claim 15, wherein a distance between the thermistor and the thermopile is fixed, a distance between the second temperature measurement module and the thermistor is adjustable, and a distance between the second temperature measurement module and the thermopile is adjustable.

* * * * *